United States Patent
Kalinli-Akbacak (10) Patent No.: US 9,031,293 B2
(45) Date of Patent: May 12, 2015

(54) MULTI-MODAL SENSOR BASED EMOTION RECOGNITION AND EMOTIONAL INTERFACE

(71) Applicant: Ozlem Kalinli-Akbacak, Burlingame, CA (US)

(72) Inventor: Ozlem Kalinli-Akbacak, Burlingame, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 250 days.

(21) Appl. No.: 13/655,834

(22) Filed: Oct. 19, 2012

(65) Prior Publication Data
US 2014/0112556 A1  Apr. 24, 2014

(51) Int. Cl.
| | |
|---|---|
| G06K 9/00 | (2006.01) |
| G10L 21/00 | (2013.01) |
| G06K 9/66 | (2006.01) |
| G10L 25/63 | (2013.01) |
| G10L 17/26 | (2013.01) |
| G06F 3/01 | (2006.01) |

(52) U.S. Cl.
CPC . *G06K 9/66* (2013.01); *G10L 25/63* (2013.01); *G06F 2203/011* (2013.01); *G10L 17/26* (2013.01); *G06F 3/011* (2013.01); *G06K 9/00302* (2013.01)

(58) Field of Classification Search
None
See application file for complete search history.

(56) References Cited

U.S. PATENT DOCUMENTS

| | | | |
|---|---|---|---|
| 4,594,575 A | 6/1986 | Avery et al. |
| 4,696,041 A | 9/1987 | Sakata |
| 4,975,960 A | 12/1990 | Petajan |
| 5,586,215 A | 12/1996 | Stork et al. |
| 5,806,036 A | 9/1998 | Stork |
| 5,852,669 A | 12/1998 | Eleftheriadis et al. |
| 5,897,616 A | 4/1999 | Kanevsky et al. |
| 5,940,794 A | 8/1999 | Abe |
| 6,161,090 A | 12/2000 | Kanevsky et al. |
| 6,185,529 B1 | 2/2001 | Chen et al. |
| 6,243,683 B1 | 6/2001 | Peters |

(Continued)

FOREIGN PATENT DOCUMENTS

| | | |
|---|---|---|
| CN | 101315733 B | 6/2010 |
| JP | 02205897 | 8/1990 |

(Continued)

OTHER PUBLICATIONS

Kalinli et el. ("prominence detection using auditory attention cues and task-dependent high level information", IEEE, transaction on audio, speech, and language processing, vol. 17, No. 5 Jul. 2009).*

(Continued)

*Primary Examiner* — Amara Abdi
(74) *Attorney, Agent, or Firm* — Joshua D. Isenberg; JDI Patent (57) ABSTRACT

Features, including one or more acoustic features, visual features, linguistic features, and physical features may be extracted from signals obtained by one or more sensors with a processor. The acoustic, visual, linguistic, and physical features may be analyzed with one or more machine learning algorithms and an emotional state of a user may be extracted from analysis of the features. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

27 Claims, 6 Drawing Sheets

(56) References Cited

U.S. PATENT DOCUMENTS

| | | | |
|---|---|---|---|
| 6,529,871 | B1 | 3/2003 | Kanevsky et al. |
| 7,117,157 | B1 | 10/2006 | Taylor |
| 7,165,029 | B2 | 1/2007 | Nefian |
| 7,209,883 | B2 | 4/2007 | Nefian |
| 7,454,342 | B2 | 11/2008 | Nefian et al. |
| 7,472,063 | B2 | 12/2008 | Nefian et al. |
| 7,742,914 | B2 | 6/2010 | Kosek et al. |
| 7,783,061 | B2 | 8/2010 | Zalewski |
| 7,809,145 | B2 | 10/2010 | Mao |
| 7,962,341 | B2 | 6/2011 | Braunschweiler |
| 8,209,182 | B2 | 6/2012 | Narayanan |
| 8,463,719 | B2 | 6/2013 | Lyon et al. |
| 8,600,749 | B2 | 12/2013 | Ljolje |
| 8,676,574 | B2 | 3/2014 | Kalinli |
| 8,756,061 | B2 | 6/2014 | Kalinli et al. |
| 2001/0051871 | A1 | 12/2001 | Kroeker |
| 2002/0128827 | A1 | 9/2002 | Bu et al. |
| 2002/0135618 | A1 | 9/2002 | Maes et al. |
| 2003/0018475 | A1 | 1/2003 | Basu et al. |
| 2004/0231498 | A1 | 11/2004 | Li et al. |
| 2006/0025989 | A1 | 2/2006 | Mesgarani et al. |
| 2006/0239471 | A1 | 10/2006 | Mao |
| 2007/0016426 | A1 | 1/2007 | Hershey et al. |
| 2008/0133228 | A1 | 6/2008 | Rao |
| 2008/0201134 | A1* | 8/2008 | Iwakura et al. ............. 704/10 |
| 2008/0201140 | A1 | 8/2008 | Wells et al. |
| 2008/0235582 | A1* | 9/2008 | Zalewski et al. ............. 715/716 |
| 2008/0249773 | A1 | 10/2008 | Bejar et al. |
| 2008/0262839 | A1 | 10/2008 | Nonaka et al. |
| 2009/0076817 | A1 | 3/2009 | Jeon et al. |
| 2009/0173216 | A1 | 7/2009 | Gatzsche et al. |
| 2009/0210220 | A1 | 8/2009 | Mitsuyoshi et al. |
| 2009/0265166 | A1 | 10/2009 | Abe |
| 2009/0313019 | A1 | 12/2009 | Kato et al. |
| 2010/0121638 | A1 | 5/2010 | Pinson et al. |
| 2010/0145695 | A1* | 6/2010 | Jung et al. ............. 704/246 |
| 2010/0280827 | A1 | 11/2010 | Mukerjee et al. |
| 2011/0004341 | A1 | 1/2011 | Sarvadevabhatla et al. |
| 2011/0009193 | A1* | 1/2011 | Bond et al. ............. 463/36 |
| 2011/0029314 | A1 | 2/2011 | Lin et al. |
| 2011/0075855 | A1 | 3/2011 | Oh et al. |
| 2011/0099009 | A1* | 4/2011 | Zopf et al. ............. 704/230 |
| 2011/0141258 | A1 | 6/2011 | Song et al. |
| 2011/0144986 | A1 | 6/2011 | Yu et al. |
| 2012/0116756 | A1 | 5/2012 | Kalinli |
| 2012/0197153 | A1 | 8/2012 | Kraus et al. |
| 2012/0253812 | A1 | 10/2012 | Kalinli et al. |
| 2012/0259638 | A1 | 10/2012 | Kalinli |
| 2013/0262096 | A1 | 10/2013 | Wilhelms-Tricarico et al. |
| 2013/0304478 | A1 | 11/2013 | Sun et al. |
| 2014/0114655 | A1 | 4/2014 | Kalinli-Akbacak |
| 2014/0149112 | A1 | 5/2014 | Kalinli-Akbacak |

FOREIGN PATENT DOCUMENTS

| | | |
|---|---|---|
| JP | 05257496 | 10/1993 |
| JP | 2006031033 A | 2/2006 |
| RU | 2403626 C2 | 11/2010 |
| WO | 2012134541 A | 10/2012 |

OTHER PUBLICATIONS

Kalinli et al., 'prominence detection using auditory attention cues and task-dependent high level information', IEEE, transaction on audio, speech, and language processing, vol. 17, No. 5 Jul. 2009.

Kalinli et al., saliency-driven unstructured acoustic scene classification using latent perceptual indexing, IEEE, MMSP'09, Oct. 5-7, 2009.

Non Final Office Action dated Sep. 17, 2013 issued for U.S. Appl. No. 13/078,866.

Non Final Office Action for U.S. Appl. No. 12/943,774, dated Jul. 1, 2013.

International Search Report and Written Opinion for International Application No. PCT/US2013/064701, dated Feb. 20, 2014.

International Search Report and Written Opinion for International Application No. PCT/US2013/071337, dated Mar. 27, 2014.

Notice of Allowance for U.S. Appl. No. 12/943,744, dated Oct. 28, 2013.

Notice of Allowance for U.S. Appl. No. 13/078,886, dated Feb. 3, 2014.

"Yoshio Matsumoto et al, ""An Algorithm for Real-time Stereo Vision Implementation of Head Pose and Gaze Direction Measurement""", IEEE International Conference on Automatic Face and Gesture Recognition—FGR, pp. 499-505, 2000".

Athanasios Nikolaidis et al, "Facial feature extraction and pose determination", Pattern Recognition, vol. 33 pp. 1783-1791, 2000.

Chris Ziegler, "Tobii and Lenovo show off prototype eye-controlled laptop, we go eyes-on (video)" downloaded from the Internet, downloaded from <http://www.engadget.com/2011/03/01/tobii-and-lenovo-show-off-prototype-eye-controlled-laptop-we-go/>, Mar. 1, 2011.

Dagen Wang et al. "Robust Speech Rate Estimation for Spontaneous Speech", IEEE Transactions on Audio, Speech, and Language Processing, vol. 15, No. 8, Nov. 2007.

Erik Murphy-Chutorian, "Head Pose Estimation in Computer Vision: A Survey", IEEE Transactions on Pattern Analysis and Machine Intelligence, vol. 31, No. 4, pp. 607-626, 2009.

Extended European Search Report dated Jul. 3, 2012 issued for European Patent Application No. 12162896.0.

Henning Risvik, "Principal Component Analysis (PCS) & NIPALS algorithm", May 10, 2007, dowloaded from http://share.auditory.ru/2006/Ivan.Ignatyev/AD/pca_nipals.pdf.

International Search Report & Written Opinion in International Application No. PCT/US2011/052192 mailed Apr. 9, 2012.

International Search Report issued date Mar. 8, 2012 for International Application No. PCT/ US/2011/059004.

Ozlem Kalinli, U.S. Appl. No. 12/943,774, filed Nov. 10, 2010.

Qiang Ji et al, "3D face pose estimation and tracking from a monocular camera" in Image Vision and Computing, vol. 20m Issue 7, May 1, 2002, pp. 499-511.

T. Nagarajan et al. "Segmentation of speech into syllable-like units", Department of Computer Science and Engineering Indian Institute of Technology, Madras, Eurospeech 2003—Geneva.

Non-Final Office Action mailed date Dec. 28, 2012 issued for U.S. Appl. No. 13/083,356.

U.S. Appl. No. 13/655,825 to Ozlem Kalinli-Akbacak, filed Oct. 19, 2012.

Chi, Tai-Shih, Lan-Ying Yeh, and Chin-Cheng Hsu. "Robust emotion recognition by spectro-temporal modulation statisticfeatures." Journal of Ambient Intelligence and Humanized Computing 3.1 (2012): 47-60.

Chi, Taishih, Powen Ru, and Shihab A. Shamma. "Multi resolution spectrotemporal analysis of complex sounds." The Journal ofthe Acoustical Society of America 118.2 (2005): 887-906.

El Ayadi, Moataz, Mohamed S. Kamel, and Fakhri Karray. "Survey on speech emotion recognition: Features, classificationschemes, and databases." Pattern Recognition 44.3 (2011): 572-587.

Ezzat, Tony, Jake V. Bouvrie, and Tomaso Poggio. "Spectro-temporal analysis of speech using 2-d Gabor filters." INTERSPEECH.2007.

Harding, Sue, Martin Cooke, and Peter Konig. "Auditory gist perception: an alternative to attentional selection of auditorystreams?" Attention in Cognitive Systems. Theories and Systems from an Interdisciplinary Viewpoint. Springer BerlinHeidelberg, 2007. 399-416.

He, Ling, et al. "Study of empirical mode decomposition and spectral analysis for stress and emotion classification in naturalspeech." Biomedical Signal Processing and Control 6.2 (2011): 139-146.

IBM, "Cell Broadband Engine Architecture", Oct. 2007, downloaded from the web, https://www-01.ibm.com/chips/techlib/techlib.nsf/techdocs/1AEEE1270EA2776387257060006E61BA/$file/CBEA_v1.02_11Oct2007_pub.pdf.

Intonation in linguistic: http://en.wikipedia.org/wiki/Intonation_(linguistics), downloaded from web Jun. 4, 2012.

Kalinli, Ozlem, and Shrikanth Narayanan. "A top-down auditory attention model for learning task dependent influences onprominence detection in speech." Acoustics, Speech and Signal Processing, 2008. ICASSP 2008. IEEE InternationalConference on. IEEE, 2008.

(56) References Cited

OTHER PUBLICATIONS

Kalinli, Ozlem, and Shrikanth S. Narayanan. "A saliency-based auditory attention model with applications to unsupervisedprominent syllable detection in speech." INTERSPEECH. 2007.

Kayser, Christoph, et al. "Mechanisms for allocating auditory attention: an auditory saliency map." Current Biology 15.21 (2005):1943-1947.

Non-Final Office Action for U.S. Appl. No. 13/655,825, dated Aug. 26, 2014.

Non-Final Office Action for U.S. Appl. No. 13/901,426, dated Oct. 8, 2014.

Schuller, Bjorn, et al. "Recognising realistic emotions and affect in speech: State of the art and lessons learnt from the firstchallenge." Speech Communication 53.9 (2011): 1062-1087.

Wu, Siqing, Tiago H. Falk, and Wai-Yip Chan. "Automatic speech emotion recognition using modulation spectral features." Speech Communication 53.5 (2011): 768-785.

Yaodong Zhang et al., "Speech Rhythm Guided Syllable Nuclei Detection", ICASSP 2009. IEEE International Conference on Acoustics, Speech and Signal Processing, pp. 3797-3800, Apr. 19-24, 2009.

Tone in linguistic: http://en.wikipedia.org/wiki/Tone_(linguistics), downloaded from web Jun. 4, 2012.

Chinese Office Action for CN Application No. 201180069832.3, dated Sep. 22, 2014.

Co-Pending U.S. Appl. No. 14/307,426, to Ozlem Kalinli-Akbacak, filed Jun. 17, 2014.

Japanese Office Action for JP Patent Application No. 2014-502540, dated Mar. 6, 2015.

Notice of Allowance for U.S. Appl. No. 13/655,825, dated Jan. 21, 2015.

\* cited by examiner

MULTI-MODAL SENSOR BASED EMOTION RECOGNITION AND EMOTIONAL INTERFACE

FIELD OF THE INVENTION

Embodiments of the present invention are related to a method for implementing emotion recognition using multi-modal sensory cues.

BACKGROUND OF THE INVENTION

Emotion recognition or understanding the mood of the user is important and beneficial for many applications; including games, man-machine interface, etc. Emotion recognition is a challenging task due to the nature of the complexity of human emotion; hence automatic emotion recognition accuracy is very low. Some existing emotion recognition techniques use facial features or acoustic cues alone or in combination. Other systems use body gesture recognition alone. Most multi-modal emotion recognition involves facial recognition and some cues from speech. The recognition accuracy depends on the number of emotion categories to be recognized, how distinct they are from each other, and cues employed for emotion recognition. For example, it turns out that happiness and anger are very easily confused when emotion recognition is based on acoustic cues alone. Although recognition tends to improve with additional modalities (e.g., facial cues combined with acoustic cues), even with only about 8 emotional categories to choose from most existing systems are lucky to achieve 40-50% recognition accuracy.

It is within this context that aspects of the present disclosure arise.

BRIEF DESCRIPTION OF THE DRAWINGS

Embodiments of the present invention can be readily understood by referring to the following detailed description in conjunction with the accompanying drawings.

DESCRIPTION OF THE SPECIFIC EMBODIMENTS

Embodiments of the present invention relate to spoken language processing methods and apparatus that use multi-modal sensors for automatic emotion recognition.

Introduction

According to aspects of the present disclosure accurate emotion recognition may be implemented using multi-modal sensory cues. By fusing multi-modal sensory data, more reliable and accurate emotion recognition can be achieved. Emotion recognition and or understanding the mood of the user is important and beneficial for many applications; including games, man-machine interfaces, and the like. For example, it can be used in a user interface to dynamically adapt the response of a game or other machine based on player's or user's emotions. The detected mood, emotional state, stress level, pleasantness, etc. of the user may be used as an input to the game or other machine. If the emotional state of the user or game player is known, a game or machine can dynamically adapt accordingly. For example, in a simple case, a game can become easier or harder for the user depending on the detected emotional state of the user. In addition, if the game or machine uses voice recognition, the detected emotional state of the user can be used to adapt the models or to select appropriate models (acoustic and language models) dynamically to improve voice recognition performance.

As far as is known, no existing emotion recognition technique has combined physiological (biometric) cues with facial feature cues, linguistic cues (e.g., the meaning of words or sentences), audio cues (e.g., energy and pitch of speech) and, cues from body gestures. According to aspects of the present disclosure a combination of such cues may be used to improve emotional state recognition.

Method for Determining Emotional State

According to certain aspects of the present disclosure a new method is proposed for reliable emotion recognition by fusing multi-modal sensory cues. These cues include, but are not limited to acoustic cues from person's voice, visual cues (i.e. facial and body features), linguistic features, physical biometric features measured from the person's body.

It is noted that certain external drivers, referred to herein as context features, may augment the acoustic, visual, linguistic, or physical features or be used as a separate set of features. Such context features are said to be related to "external" drivers in the sense that the measurements of such drivers are not solely measurements of features of the user per se. In some implementations, the acoustic, visual, linguistic, and physical features may be augmented by such context features. In other implementations, the context features are processed as a separate set of features.

By way of non-limiting example, the acoustic features may include environmental sounds and music as input context features. The visual features may include context features such as environmental lighting and objects other than the user detected in an image obtained with a camera. The physical features may include context features such as environmental factors such as environmental temperature and humidity. Alternatively, such context features, may be processed separately from the acoustic, visual, linguistic, and physical features. Furthermore, context features, such as game state at a given instant, the presence of other player or non-player characters, conversation between the user and others, time of day, and the like as external drivers. Some of these context features may also be used to normalize some of the user's features before inputting them into a machine learning algorithm in a subsequent analysis step if there is benefit of doing so. In addition, context features may also be used as input features to a machine learning algorithm and let machine learner to figure out how they need to be handled for robust emotion recognition.

Figure 1A:
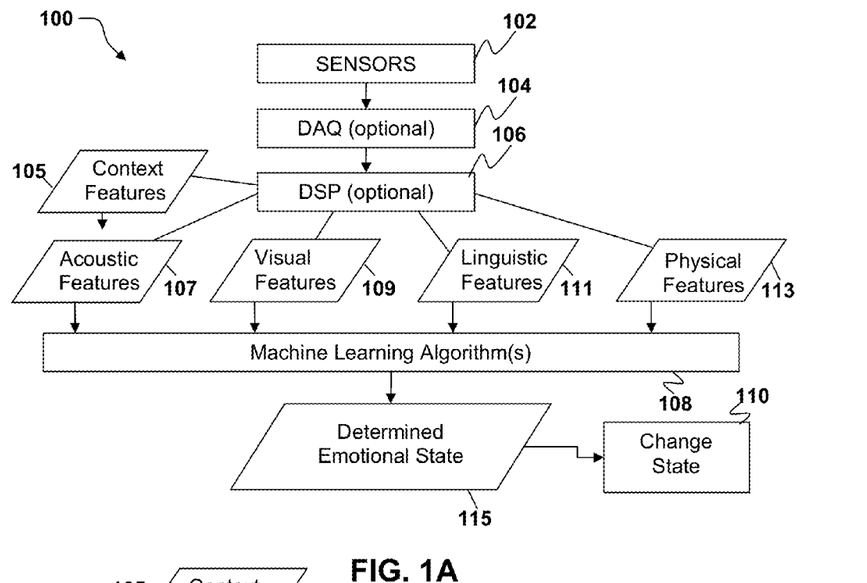
FIGS. 1A-1D are flow diagrams illustrating examples of methods for determining an emotional state of a user in accordance with certain aspects of the present disclosure.
Figure 1B:
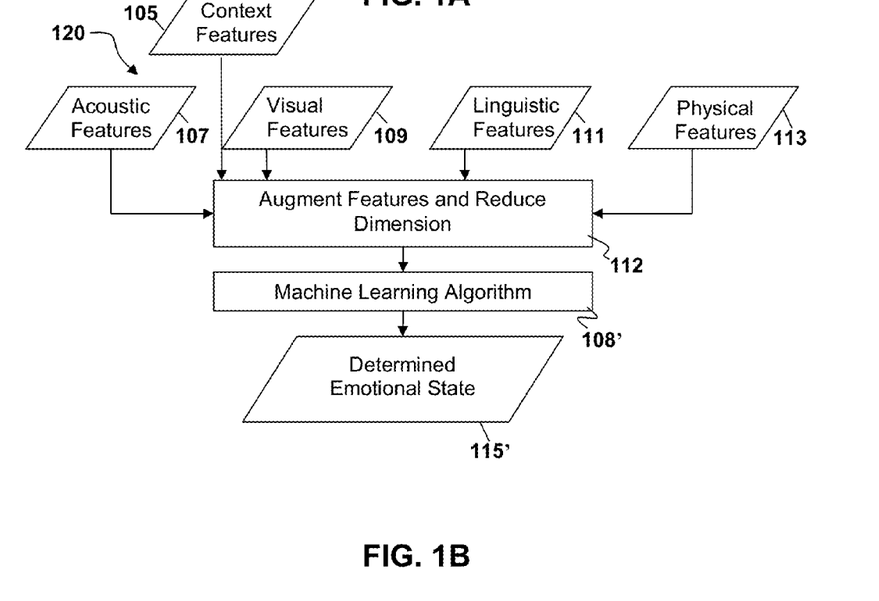
Figure 1C:
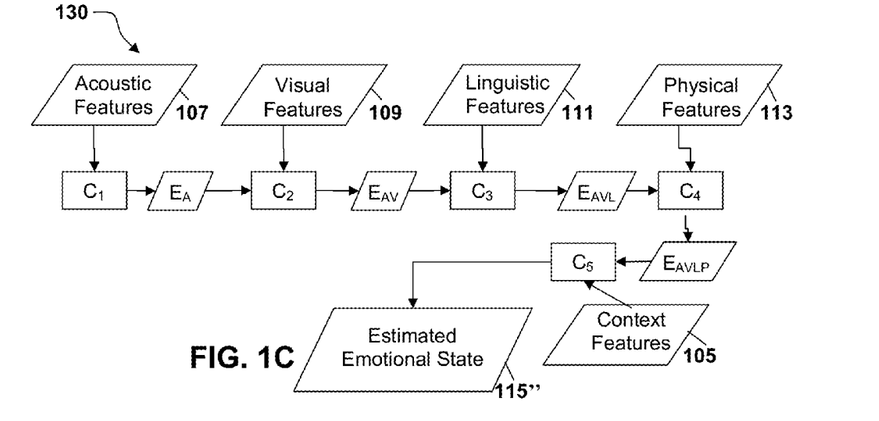
Figure 1D:
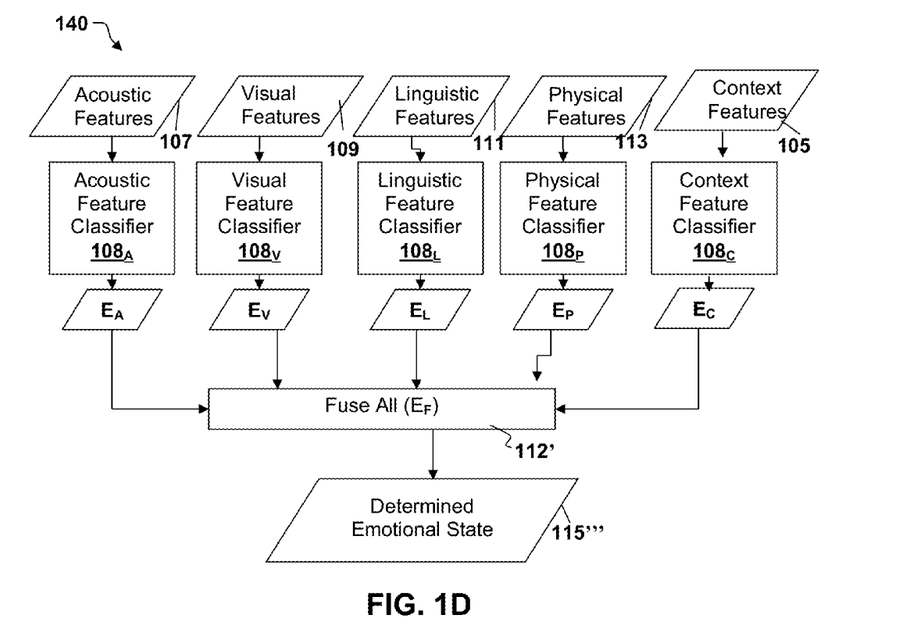

In general terms, a method 100 for determining an emotional state of a user may proceed as illustrated in FIG. 1A. Variations on the general technique shown in FIG. 1A are illustrated in FIGS. 1B-1D. Referring to FIG. 1A, one or more acoustic features 107, visual features 109, linguistic features 111, and physical features 113 of user may be derived from signals obtained by one or more sensors 102. The sensors may be coupled to a suitably configured processor apparatus, e.g., a digital signal processor (DSP) 106 through a data acquisition (DAQ) interface 104. The DSP 106 may filter the signals from the various sensors 102 to extract relevant features. The acoustic features, visual features, linguistic features, physical, and (optional) context features are analyzed with one or more machine learning algorithms, which may be implemented on one or more data processing devices, such as one or more general purpose computers that are programmed to implement machine learning. The machine learning algorithm(s) can determine an emotional state 115 from analysis of the acoustic features, visual features, linguistic features, physical, and (optional) context features. Once the emotional state 115 has been determined, it can be fed into a computer or machine as an input or feedback, optionally the state of a computer system or machine may be changed based on the determined emotional state, as indicated at 110.

There are a number of different possible examples of acoustic features 107. For example, acoustic features may be extracted from the user's speech. Such acoustic features may include, e.g., prosodic features (pitch, energy, pause duration, and various variations and statistics thereof), mel-frequency Cepstral Coefficients (MFCCs), energy in spectral bands, harmonics-to-noise ratio, roll-off, zero-crossing rate, auditory attention features, speaking rate, etc., and various combinations thereof. Signals relating to the user's voice may be obtained using a microphone or microphone array as a sensor. These features may include non lexical sounds such as disfluencies, fillers, laughter, scream, etc.

The visual features 109 may include, but are not limited to, facial expressions (e.g., derived from positions or motions of the eyes, eyebrows, lips, nose, mouth), head poses, and body gestures (e.g., derived from positions or motions of the user's hands, arms, legs, feet, walking/standing), from eye movements, such as pupil width/dilation, etc.

Visual or sound characteristics of a movie or game also may intend to trigger a certain emotion category in the user; i.e. some scenes makes us calm due to music, or some scenes make us excited due to its fast phase etc. Hence, audio/visual features from the content of a video or game should also be included for emotion recognition of user. Even linguistic features from the content can be included. Thus, in some implementations, the method 100 may optionally also take into account these context features 105.

As noted above, the optional context features 105 may include external drivers such as environmental sounds and music, environmental lighting and objects other than the user detected in an image obtained with a camera, environmental factors such as environmental temperature and humidity, game state at a given instant, the presence of other player or non-player characters, conversation between the user and others, time of day, and the like as external drivers. By way of example, and not by way of limitation, the context features 105 may include sounds not necessarily extracted from the user's speech. Such sounds may include non-lexical voice sounds as well as environmental sounds and music in a movie or game, which may be attempting to evoke a certain emotion in the user. For example, timbre and rhythm can be used to characterize emotion in music.

The context features 105 may also include visual features not necessarily extracted from images of the user. For example, such features may include visual features of movie or game which may be attempting to evoke a certain emotion in the user. For example, color and motion and such features can be used to characterize emotion in video.

The linguistic features 111 may include, but are not limited to semantics, syntax, and lexical features. These features can be extracted from a voice signal or from text (e.g., if speech recognition is used for speech-to-text in the system or the user can enter text if there is no voice recognition). In addition, transcription of non-linguistic vocalizations such as sighs, yawns, laughs, screaming, hesitations, etc. may carry important emotions as well. Also, the selected words carry information about the speaker and his/her emotions; such as the usage and frequency of words like: again, angry, assertive, very, good, great, lovely, pronouns (I), and the like. Similarly word order and syntax may carry information about the speaker. Lexical features, such as a selected set of words that are emotionally important may be detected, e.g., using a keyword spotter. The set of words can be decided in a data-driven manner or rule-based based on linguistic and psychological studies. The syntactic knowledge can be represented using the part-of-speech (POS) tags.

The physical features 113 may include, but are not limited to, vital signs (e.g., heart rate, blood pressure, respiration rate) and other biometric data. The body reacts to emotional state relatively quickly even before the subject verbally and/or visually expresses his/her emotions/feelings. For example, heart rate, blood pressure, skin moisture, and respiration rate can change very quickly and unconsciously. A user's grip on an object may tighten unconsciously when anxious. In addition to heart rate, blood pressure (BP), and respiratory rate (breathing frequency), depth and pace of breath, serotonin (happiness hormone), epinephrine (adrenal), skin moisture level (sweating), skin temperature, pressure in hands/fingers/wrist, level of saliva, hormones/enzymes in saliva (cortisol in saliva in an indication of stress), skin conductance (an indication of arousal), and the like are also useful physical features.

The nature of the sensors 102 depends partly on the nature of the features that are to be analyzed. For example, a microphone or microphone array may be used to extract acoustic features 107. The microphone or microphone array may also be used in conjunction with speech recognition software to extract linguistic features 111 from a user's speech. Linguistic features may also be extracted from text input which is captured by keypad, keyboard, etc.

Figure 2:
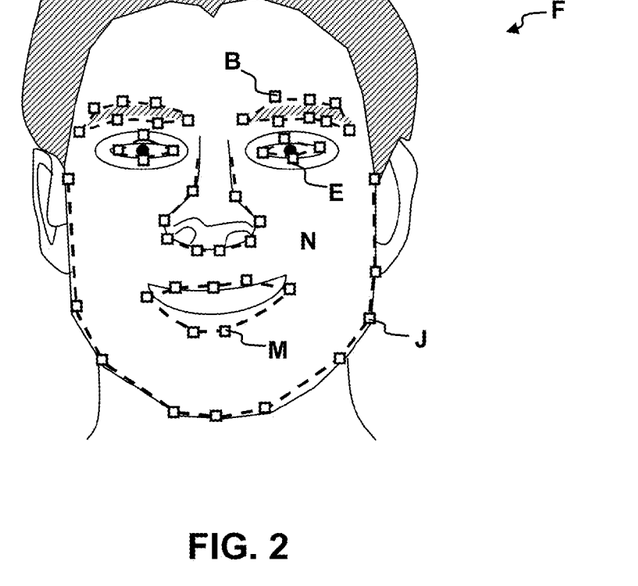
FIG. 2 is schematic diagram illustrating a map of facial points that may be used in conjunction with certain aspects of the present disclosure.

Visual features, e.g., facial expressions and body gestures may be extracted using a combination of image capture (e.g., with a digital camera for still or video images) and image analysis. In particular, facial expressions and body gestures that correspond to particular emotions can be characterized using a combination feature tracking and modeling. For example, the display of a certain facial expression in video may be represented by a temporal sequence of facial motions. Each expression could be modeled using a hidden Markov model (HMM) trained for that particular type of expression. The number of HMMs to be trained depends on the number of expressions. For example, if there are six facial expressions, e.g., happy, angry, surprise, disgust, fear, sad, there would be six corresponding HMMs to train. An example of a facial map is shown in FIG. 2. In this example, an image of a user's face may be mapped in terms of sets of points that correspond to the user's jawline, eyelids, eyebrows, mouth, and nose.

Figure 3:
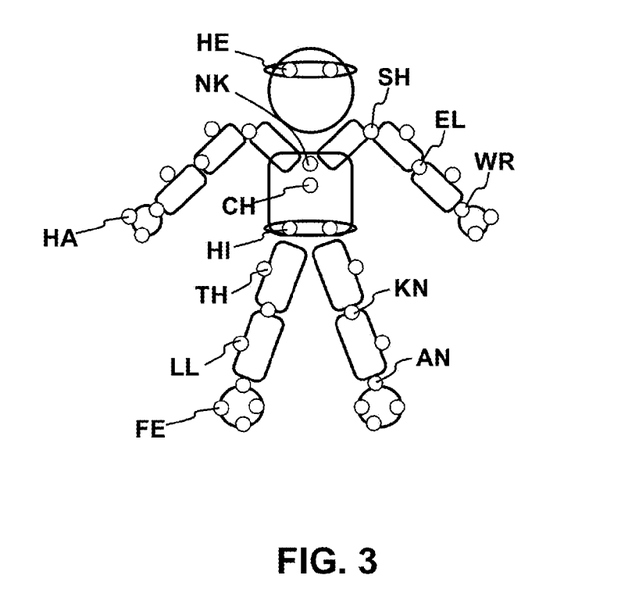
FIG. 3 is a schematic diagram illustrating a map of body points that may be used in conjunction with certain aspects of the present disclosure.

Examples of emotion recognition by facial feature tracking are described, e.g., by Ira Cohen et al. in "Emotion Recognition from Facial Expressions using Multilevel HMM", *In Neural Information Processing Systems,* 2000, which is incorporated herein by reference for all purposes. Examples of emotion recognition by body gesture tracking is described e.g., by A. Metallinou et al, in "TRACKING CHANGES IN CONTINUOUS EMOTION STATES USING BODY LANGUAGE AND PROSODIC CUES", Proceedings of the 2011 IEEE International Conference on Acoustics, Speech, and Signal Processing (ICASSP), 22-27 May 2011, pp. 2288-2291, the entire contents of which are incorporated herein by reference. Body language tracking may be implemented in a manner similar to facial feature tracking. Different points on the body may be tracked in a series of images to determine a body gesture. An example of a map of body points is shown in FIG. 3. In this case, the body points may include the joints at the users wrists WR, elbows EL, arms, shoulders SH, neck NK, chest CH, hips HI, thighs TH, knees KN, lower legs LL, and ankles AN as well as the extremities (hands HA, feet FE, and head HE). A finite set of one or more emotional states may be correlated to one or more corresponding body gestures.

An emotion associated with an extracted feature may be characterized in continuous scale representation in terms of valence and arousal. Valence shows whether an emotion is negative or positive. Arousal basically measures the strength of the emotion. This two-dimensional valence-arousal has become popular due to its high descriptive power and flexibility. In addition to two-dimensional model, the three dimensional valence-arousal-dominance model (or valence-arousal-tension model for music) can also be used. Methods for classification of emotions into these subspaces can be data driven.

Examples of emotional states and corresponding body gestures are listed in Table I below along with valence and arousal for each emotional state.

TABLE I

| Emotion | Valence | Arousal | Gesture |
| --- | --- | --- | --- |
| Anger | Negative | High | Violent descent of hands |
| Despair | Negative | High | Leave me alone |
| Interest | Positive | Low | Raise hands |
| Pleasure | Positive | Low | Open hands |
| Sadness | Negative | Low | Smooth falling hands |
| Irritation | Negative | Low | Smooth go away |
| Joy | Positive | High | Circular Italianate movement |
| Pride | Positive | High | Close hands toward chest |

For further details see G. Castellanos et al, "Emotion Recognition through Multiple Modalities: Face, Body Gesture, Speech" in *Affect and Emotion in Human-Computer Interaction Lecture Notes in Computer Science,* 2008, Volume 4868, 2008, pages 92-103, which is incorporated herein by reference.

Figure 5:
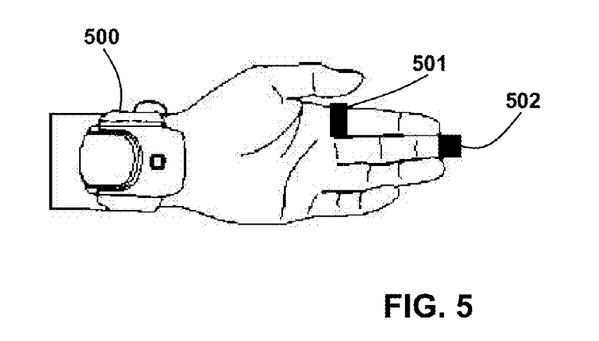
FIG. 5 is a schematic diagram illustrating placement of physiological sensors on a wrist band, ring and finger cap for physiologic sensing in conjunction with certain aspects of the present disclosure.
Figures 6A, 6B:
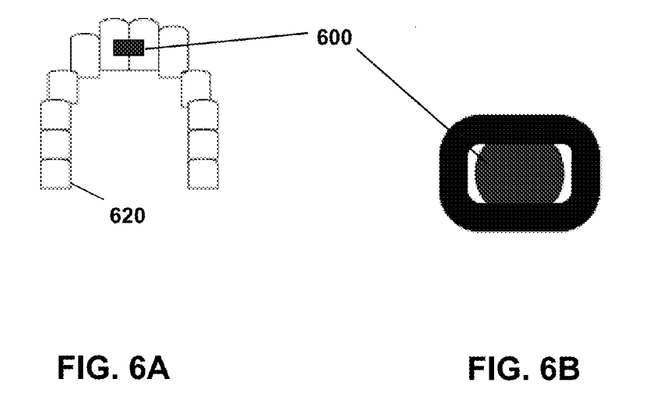
FIG. 6A is a schematic diagram illustrating placement of physiological sensors on an apparatus held in a user's mouth for physiologic sensing in conjunction with certain aspects of the present disclosure.
FIG. 6B is a schematic diagram illustrating a physiological sensor on an apparatus for physiologic sensing in conjunction with certain aspects of the present disclosure.

Any number of different sensors may be used to provide signals corresponding to physical features 113. Using some sensory devices, wearable body sensors/devices such as wrist band 500, ring 501, finger cap 502, mouth ball 600, a head band/cap enriched with sensors (i.e. electroencephalogram (EEG) that measure brain activity and stimulation,) wearable brain-computer interface (BCI), accelerometer, microphone, etc., aforementioned cues can be measured and transmitted to a computer system. Usually these physical indicators react faster; even before the subject verbally and/or visually expresses emotions or feelings through speech, facial expression, body language, and the like. Physiologic cues include, body temperature, skin moisture, saliva, respiration rate, heart rate, serotonin, etc.

Figure 4:
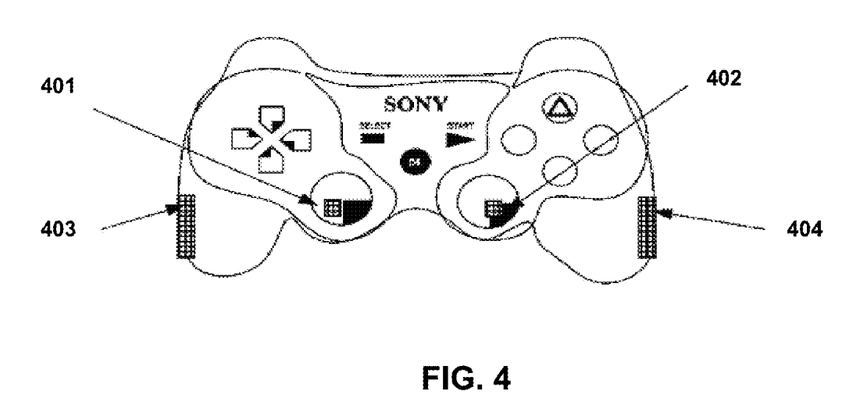
FIG. 4 is a schematic diagram illustrating placement of physiological sensors on a game controller for physiologic sensing in conjunction with certain aspects of the present disclosure.

By placing groups of electrode sensors, for example on a game controller as in FIG. 4, to measure the nerve activation of the fingers and/or of the body, some of the aforementioned physical cues of the finger and human body can be measured. For example, the sensors can measure the stress/pressure level of nerves. Also these sensors can measure the temperature, conductance, and moisture of the human body. Some sensors can also be in the back of the controller as shown in FIG. 4. By way of example and not limitation, sensors can be placed on the controller to take measurements from the thumbs 401 and 402, or from the palms of the hands 403 and 404.

Alternatively, sensors may be located on a wristband 500 that is worn by a user, e.g., as shown in FIG. 5. The sensors may be configured to measure pulse, temperature, moisture, pressure, and the like.

According to some aspects, the sensors may include a mouth ball 600 that has sensors as shown in FIGS. 6A and 6B. By way of example and not limitation, FIG. 6A shows the teeth 620 bottom-up view from inside the user's mouth. The sensors in the mouth ball 600 may measure levels of saliva, or hormones or enzymes in saliva that are indicative of emotional state. By way of example, and not by way of limitation, adrenal hormone, AM cortisol in saliva, indicates situational stress. In alternative implementations, sensors can be attached on the chest directly or can be attached using a wearable band for measuring some of the cues such as respiratory rate, depth of breath, etc. According to other alternative implementations, a user may wear a cap or headset (not shown) with sensors for measuring electrical brain activity. A similarly configured apparatus may be used to obtain measurements for estimating hormone levels such as serotonin. For example, through deep brain stimulation, a Wireless Instantaneous Neurotransmitter Concentration System (WINCS) can detect and measure serotonin levels in the brain. WINCS can measure serotonin with a technology called fast-scan cyclic voltammetry, which is an electrochemical method of being able to measure serotonin in real time in the living brain. Also, a blood lancet, a small medical implement can be used for capillary blood sampling to measure some hormone levels in the blood. In addition, some types of sensors may be worn around the user's neck, e.g., on a necklace or collar in order to monitor one or more of the aforementioned features.

By way of example and not by way of limitation some possible sensors and their locations are listed in TABLE II below, which is described by J. Parkka et al. "Activity Classification Using Realistic Data from Wearable Sensors" in IEEE Transactions on Information Technology in Biomedicine, 10, Issue 1, pp. 119-128, January, 2006, which is incorporated herein by reference. More sensors can be attached to the user in different locations as well. For example, accelerometers can be also located on the hip, arms, ankle, thigh, etc. Some of these sensors can also be used to estimate the physical activity (i.e. sitting, lying, running, etc.) of the user and then this activity can be factored into the emotion recognition process. For example, some games involve dancing of the user which increases the physical activity, which might be affecting the statistics of some measured features. In addition, physical activity can either be used to normalize some measured features or can directly be included as a quantized feature by itself during emotion recognition.

TABLE II

| Signal | Sensor | Measurement Site | Signal | Sensor | Measurement Site |
|---|---|---|---|---|---|
| Audio | Microphone | | Pulse Plethysmogram | IR Light Reflectance (Nonin XPOD) | Forehead |
| Heart Rate | IR Light Absorption (Embla XN oximeter) | Finger | Respiratory Effort | Piezoelectric sensor | Chest |
| Heart Rate | IR Light Reflectance (Nonin XPOD) | Forehead | SaO$_2$ | IR Light Absorption (Embla XN oximeter) | Finger |
| Heart Rate | Voltage between Chest Belt electrodes (Suunto X6HR) | Chest | SaO$_2$ | IR Light Reflectance (Nonin XPOD) | Forehead |
| Wrist Accelerations | 3D acceleration (analog Devices, ADXL 202E) | Wrist, Dominant hand | Chest Accelerations | 3D acceleration (2x analog Devices, ADXL202) | Chest on rucksack strap |
| Wrist Compass | 2D compass (Honeywell HMC-1022) | Wrist, Dominant Hand | | | |
| EKG | Voltage between EKG electrodes (e.g., Blue Sensor VL, Embla A10) | Below left armpit on breastbone | Chest Compass | 3D compass (Honeywell HMC-1023) | Chest on rucksack strap |
| Environmental Temperature | Temperature (e.g., Analog Devices TMP 36) | Chest on rucksack strap | Skin Resistance (or conductance) | Resistance between two metal leads | Chest |
| Environmental Humidity | Humidity (e.g., Honeywell HIH-3605-B) | Chest on rucksack strap | Skin Temperature | Resistive Temperature Sensor | Upper Back below Neck |

According to aspects of the present disclosure analysis of the (optional) context features 105, acoustic features 107, visual features 109, linguistic features 111 and physical features 113 can be combined using one or more machine learning algorithms in different ways to recognize emotions of the user. FIGS. 1B-1D illustrate a few possible implementations that are consistent with the approach shown in FIG. 1A.

In some implementations, analyzing the acoustic features, visual features, linguistic features, physical features, and (optional) context features may include use of a machine learning algorithm that analyzes a combination of two or more different types of features from the group of the acoustic features, visual features, linguistic features, physical features, and (optional) context features. By way of example in a method 120, e.g., as illustrated in FIG. 1B analysis of the acoustic features 107, visual features 109, linguistic features 111 and physical features 113, and (optional) context features 105 may be combined at the feature level. Specifically, the acoustic features 107, visual features 109, linguistic features 111, physical features 113, and context features 105 may be augmented and their dimension reduced, as indicated at 112. Suitable techniques, e.g., using Principal Component Analysis (PCA), Linear Discriminant Analysis (LDA) or herterogastic LDA (HLDA) may be implemented in software or hardware or some combination thereof to reduce the dimension of the data obtained for each feature type. The resulting augmented reduced-dimension feature set may then be analyzed by a machine learning algorithm 108' to determine an emotional state 115'. The machine learning algorithms such as neural networks, nearest neighbor classifiers, decision trees, support vector machines (SVM), Gaussian Mixture Models (GMM), Hidden Markov Models (HMM), etc., can be used to discover the mapping between the features and emotion classes. By way of example, and not by way of limitation, the machine learning algorithm 108' may determine a probability for each of a number of different possible emotional states and determine that the state with the highest probability is the estimated emotional state.

It is noted that in the example shown in FIG. 1B the acoustic features 107, visual features 109, linguistic features 111, physical features 113, and (optional) context features 105 are all augmented. Alternatively, some combination of two or more of the acoustic features 107, visual features 109, linguistic features 111, physical features 113, and context features 105 may be augmented.

According to other aspects of the present disclosure, analyzing the acoustic features, visual features, linguistic features, physical features, and context features may include the use of separate machine learning algorithms for the acoustic, visual, linguistic, physical features, and context features. For example, as shown in FIG. 1C, a method 130 may be implemented in which a first machine learning algorithm $C_1$ analyzes a first feature type (e.g., acoustic features 107) and provides a first estimated emotional state $E_A$ that is fed to a second machine learning algorithm $C_2$ in a serial fashion. The second machine learning algorithm $C_2$ takes the first estimated emotional state $E_A$ into account when analyzing a second (different) feature type (e.g., visual features 109) to produce a second estimated emotional state $E_{AV}$. The second estimated emotional state $E_{AV}$ may be fed to a third machine learning algorithm $C_3$ that takes the second estimated emotional state $E_{AV}$ into account in analyzing a third feature type (e.g., linguistic features 111) to produce a third estimated emotional state $E_{AVL}$. The third estimated emotional state $E_{AVL}$ may be fed to a fourth machine learning algorithm $C_4$ that takes the third estimated emotional state $E_{AVL}$ into account in analyzing a fourth feature type (e.g., physical features 113) to produce a fourth estimated emotional state $E_{AVLP}$. The fourth estimated emotional state $E_{AVLP}$ may be fed to a fifth machine learning algorithm $C_5$ that takes the fourth estimated emotional state $E_{AVLP}$ into account in analyzing a fifth feature type (e.g., context features 105) to produce a final estimated emotional state 115"

It is noted that the method 130 shown in FIG. 1C represents one possible implementation. Other implementations are possible, e.g., in which the order of the hierarchy is different (e.g., visual features first, then acoustic features, then linguistic features, then physical features). Furthermore, the hierarchy may involve less than all of the different feature types. By way of example, and not by way of limitation, each of machine learning algorithms $C_1$, $C_2$, $C_3$, $C_4$, $C_5$, may determine a probability for each of a number of different possible emotional states and determine that the state with the highest probability is the estimated emotional state.

In yet other implementations analysis of the different feature types may be combined at a decision level. Specifically, in the method 140 as depicted in FIG. 1D, parallel machine learning algorithms (classifiers) 108$_A$, 108$_V$, 108$_L$, 108$_P$, and 108$_C$ may be trained to analyze the acoustic, visual, linguistic, physical and context feature types, respectively and obtain corresponding estimated emotional states $E_A$, $E_V$, $E_L$, $E_P$, and $E_C$. The estimated emotional states obtained in parallel from the different classifiers can be fused, as indicated at 112' to establish a final estimated emotional state 115'''. The fusing process may look at the results $E_A$, $E_V$, $E_L$, $E_P$, and $E_C$ from the corresponding emotion classifiers 108$_A$, 108$_V$, 108$_L$, 108$_P$ and 108$_C$ and derive the final estimated emotional state 115. The fusing process may be as simple as taking the average of probability scores of each emotion category over all four classifiers and then taking the maximum of the averaged probability scores for estimating the emotion class. In addition, the fusion process can be accomplished using another machine learning algorithm (classifier) $E_F$ which learns the correlation between the targeted emotion classes and the input which comes from $E_A$, $E_V$, $E_L$, $E_P$, and $E_C$ in a data driven way. For example, the input of $E_F$ can be the probability score of each emotion class from each classifier; i.e. if there are 8 emotion classes in the task, there will 8 probability scores output from each of $E_A$, $E_V$, $E_L$, $E_P$, and $E_C$ total 8×5=40 dimensional input into the learner in the fusion processing block. In a sense, the machine learning will determine how to use and weight the individual classifiers to maximize the emotion recognition performance in a data driven way using some training data that has emotion class labels.

Alternatively, $E_A$, $E_V$, $E_L$, $E_P$, and $E_C$ can also be configured to classify emotion in valence-activation domain first, and then input this information in the fusing machine learner $E_F$ to obtain the final emotion state of the user.

Emotions can be designed as discrete categories; i.e. happy, angry, neutral, sad, bored, emphatic, irritated, surprised, etc. and the user's emotional state can be categorized into one of above. In addition, soft decision may be used where at a given time the user's emotion is represented as a mixture of above categories that shows at a certain time how happy a person is, how sad at the same time etc. Also, the user's emotional state may be estimated in valence-activation domain as well. Based on the application which will utilize user's emotion information, one or more of above choices can be made.

Application to Speech Recognition

As noted above, an emotional state determined from multimodal analysis may trigger a change in state of a computer system. One example, among others of a change in state is related to use of emotion estimation in conjunction with speech recognition implemented on a computer system. Speech recognition systems have become a common form of input for computer systems. A typical speech recognition system captures an audible signal and analyzes for recognizable components of human speech. Modern speech recognition systems make use of an acoustic model to analyze a speech signal to determine the meaning of the underlying speech.

Acoustic models are trained for a relatively neutral emotional state. However, if the speaker's emotional state changes, their speaking style changes and it throws off the speech recognition model. Unfortunately, existing usable techniques for recognizing emotional state have low recognition accuracy. Consequently, existing speech recognition systems do not take emotional state into account in training the acoustic model.

In order to perform emotion estimation according to embodiments of the present invention as described above, a signal processing device may be configured to perform arithmetic and other operations to implement emotion recognition in accordance with aspects of the present disclosure, e.g., as described above with respect to FIGS. 1A-1D.

The signal processing device can be any of a wide variety of communications devices. For example, a signal processing device according to embodiments of the present invention can be a computer, personal computer, laptop, handheld electronic device, cell phone, videogame console, portable game device, tablet computer, etc.

Once an emotional state has been determined for the user, one or more models used in a speech recognition algorithm may be adjusted in a way that takes the determined emotional state into account. By way of example, and not by way of limitation, many acoustic models can be pre-trained where each is tuned to a specific emotion class. For example, during training, an acoustic model can be tuned for "excited" emotion class by using data collected from users who is excited. Then, at runtime, based on user's estimated emotion state, the matching acoustic model can be used to improve speech recognition performance. Similarly, the language model and dictionary can be adapted based on the emotion. For example, when people are bored they tend to speak slower whereas excited people tend to speak faster, which eventually changes word pronunciations. The dictionary, which consists of the pronunciation of words as a sequence of phonemes, can also be dynamically adapted based on the user's emotion to better match the user's speech characteristic due to his/her emotion. Again, multiple dictionaries tuned to certain emotion classes can be created offline, and then used based on the estimated user emotion to improve speech recognition performance.

Apparatus for Determining Emotional State

According to additional aspects, some new emotional user interfaces and inputs to machines and games are proposed.

Figure 7:
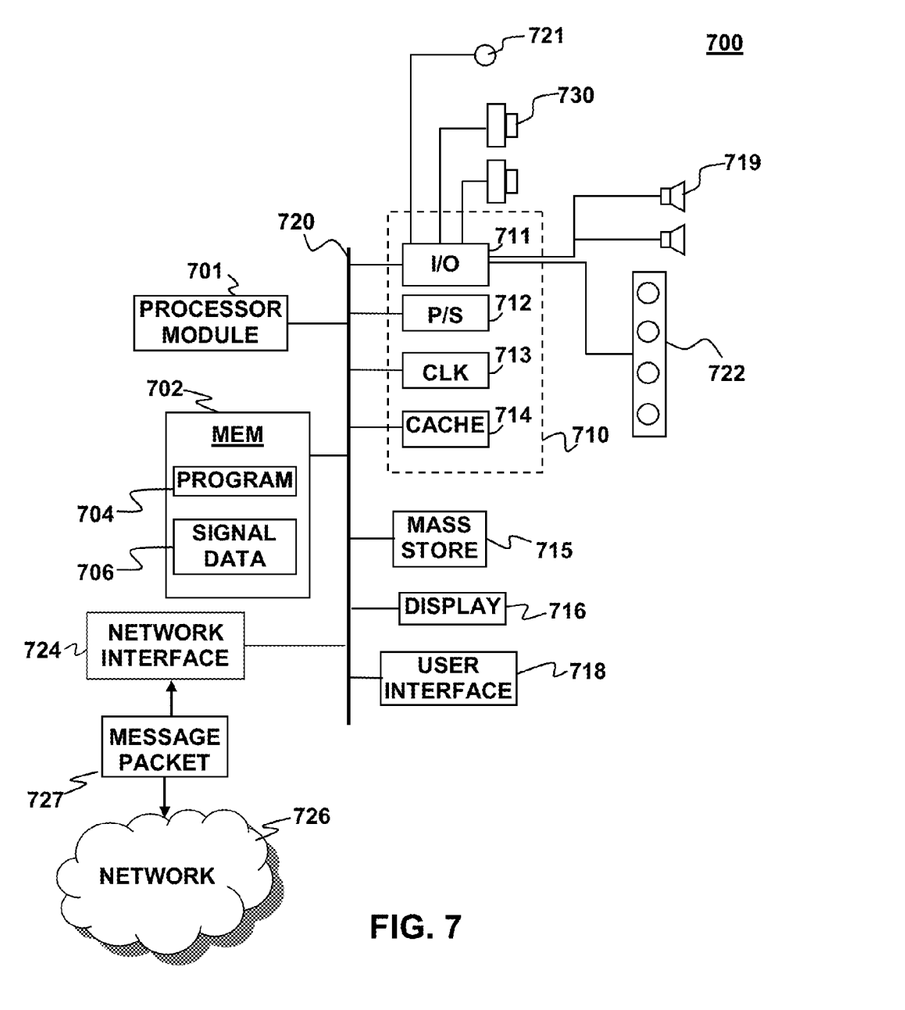
FIG. 7 is a block diagram illustrating an example of an apparatus for implementing emotion estimation in conjunction with certain aspects of the present disclosure.

By way of illustrated example, and without limitation FIG. 7, depicts a possible signal processing apparatus 700 configured to perform emotion estimation in accordance with aspects of the present disclosure. The apparatus 700 may include a processor module 701 and a memory 702 (e.g., RAM, DRAM, ROM, and the like). In some implementations, the processor module 701 may include multiple processor cores, e.g., if parallel processing is to be implemented. Examples of suitable multi-core processors, include, but are not limited to dual-core processors, quad-core processors, processor architectures having a main processor and one or more co-processors, cell processor architectures, and the like.

The memory 702 may store data and code configured to facilitate emotion estimation in any of the implementations described above. Specifically, the memory 702 may contain signal data 706 which may include a digital representation of input signals (e.g., after analog to digital conversion as discussed above), and code for implementing emotion estimation by analyzing information contained in the digital representations of input signals.

The apparatus 700 may also include well-known support functions 710, such as input/output (I/O) elements 711, power supplies (P/S) 712, a clock (CLK) 713 and cache 714. The apparatus 700 may include a mass storage device 715 such as a disk drive, CD-ROM drive, tape drive, or the like to store programs and/or data. The apparatus 700 may also include a display unit 716 and user interface unit 718 to facilitate interaction between the apparatus 700 and a user. The display unit 716 may be in the form of a cathode ray tube (CRT) or flat panel screen that displays text, numerals, graphical symbols or images. The user interface 718 may include a keyboard, mouse, joystick, light pen or other device. In addition, the user interface 718 may include a microphone, video camera 730 or other signal transducing device to provide for direct capture of a signal to be analyzed. The camera may be a conventional digital camera that produces two-dimensional images. Alternatively, the video camera may also be configured to provide extra information that can be used to extract information regarding the depth of features shown in one or more images. Such a camera is sometimes referred to as a depth camera. A depth camera may operate based on the principle of stereo imaging in which images obtained by two slightly offset cameras are analyzed to determine depth information. Alternatively, a depth camera may use a pattern of structured light, e.g., infrared light, projected onto objects in the camera's field of view. The processor module 701 may be configured to analyze the distortion of the pattern of structured light that strikes objects in the field of view to determine relative depth information for pixels in images obtained by the camera.

By way of example, the processor module 701, memory 702 and other components of the system 700 may exchange signals (e.g., code instructions and data) with each other via a system bus 720.

The input signals may be obtained using a variety of different types of sensors, several examples of which are described above. By way of example, one or more microphones, e.g., a microphone array 722 may be coupled to the apparatus 700 through the I/O functions 711. The microphone array may include one or more microphones. Each microphone the microphone array 722 may include an acoustic transducer that converts acoustic signals into electrical signals. The apparatus 700 may be configured to convert analog electrical signals from the microphones into the digital signal data 706.

It is further noted that in some implementations, one or more sound sources 719 may be coupled to the apparatus 700, e.g., via the I/O elements or a peripheral, such as a game controller. In addition, one or more image capture devices 730 may be coupled to the apparatus 700, e.g., via the I/O elements 711 or a peripheral such as a game controller. In addition, one or more physiologic sensors 721 (e.g., for detecting heart rate, respiration rate, perspiration, blood oxygen, brain activity, hormone levels, and the like) may coupled to the apparatus via the I/O elements or a peripheral, such as a game controller. Furthermore the apparatus 700 may also include one or more environmental sensors 723, which may be configured to sense environmental conditions, including, but not limited to environmental temperature, humidity, altitude, light intensity, It is noted that the I/O functions may be configured to implement the data acquisition function indicated at 104 of FIG. 1A.

As used herein, the term I/O generally refers to any program, operation or device that transfers data to or from the system 700 and to or from a peripheral device. Every data transfer may be regarded as an output from one device and an input into another. Peripheral devices include input-only devices, such as keyboards and mousse, output-only devices, such as printers as well as devices such as a writable CD-ROM that can act as both an input and an output device. The term "peripheral device" includes external devices, such as a mouse, keyboard, printer, monitor, microphone, game controller, camera, external sensor, external Zip drive or scanner as well as internal devices, such as a CD-ROM drive, CD-R drive or internal modem or other peripheral such as a flash memory reader/writer, hard drive.

The apparatus 700 may include a network interface 724 to facilitate communication via an electronic communications network 726. The network interface 724 may be configured to implement wired or wireless communication over local area networks and wide area networks such as the Internet. The apparatus 700 may send and receive data and/or requests for files via one or more message packets 727 over the network 726.

The processor module 701 may perform digital signal processing on signal data 706 as described above in response to the signal data 706 and program code instructions of a program 704 stored and retrieved by the memory 702 and executed by the processor module 701. Code portions of the program 704 may conform to any one of a number of different programming languages such as Assembly, C++, JAVA or a number of other languages. The processor module 701 forms a general-purpose computer that becomes a specific purpose computer when executing programs such as the program code 704. Although the program code 704 is described herein as being implemented in software and executed upon a general purpose computer, those skilled in the art may realize that the method of emotion estimation could alternatively be implemented using hardware such as an application specific integrated circuit (ASIC) or other hardware circuitry. As such, embodiments of the invention may be implemented, in whole or in part, in software, hardware or some combination of both.

An embodiment of the present invention may include program code 704 having a set of processor readable instructions that implement emotion estimation methods e.g., as described above, e.g., with respect to FIGS. 1A-1D. The program code 704 may generally include instructions that direct the processor to perform a multi-modal method for determining an emotional state of a user that involves extracting one or more acoustic features, visual features, linguistic features, and physical features of the user (and, optionally, context features) from signals obtained by one or more sensors with the processor module 701, analyzing the acoustic features, visual features, linguistic features, and physical features and optional context features with one or more machine learning algorithms implemented on the processor module 701, and extracting an emotional state of the user from analysis of the acoustic features, visual features, linguistic features, and physical features and optional context features with a machine learning algorithm implemented on the processor module 701. The program code 704 may be configured to implement one or more of the aspects describe with respect to FIG. 1B, FIG. 1C, and FIG. 1D. The program code 704 may optionally modify an acoustic model for speech recognition according to an estimated emotional state determined from multiple modes of input features.

Figure 8:
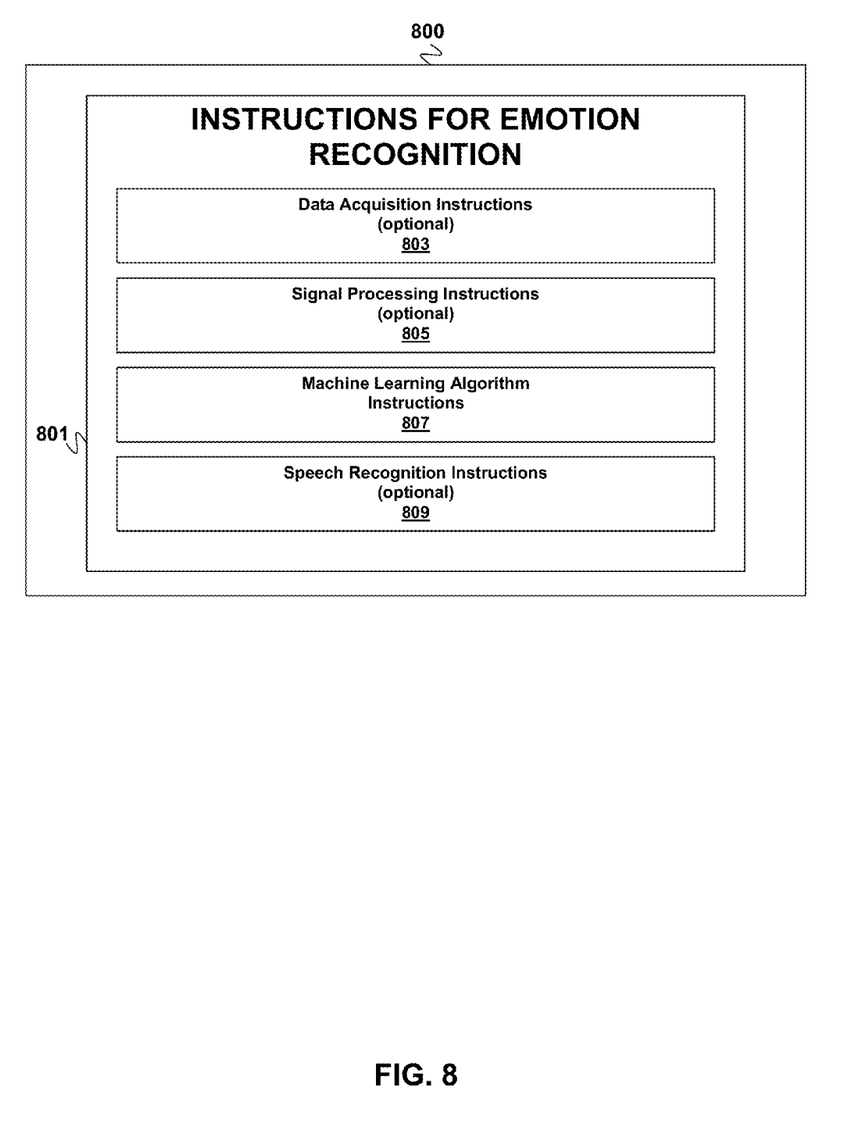
FIG. 8 is a block diagram illustrating an example of a non-transitory computer-readable storage medium with instructions for implementing emotion estimation in conjunction with certain aspects of the present disclosure.

According to another embodiment, instructions for emotion estimation may be stored in a computer readable storage medium. By way of example, and not by way of limitation, FIG. 8 illustrates an example of a non-transitory computer readable storage medium 800 in accordance with an embodiment of the present invention. The storage medium 800 contains computer-readable instructions stored in a format that can be retrieved, interpreted, and executed by a computer processing device. By way of example, and not by way of limitation, the computer-readable storage medium 500 may be a computer-readable memory, such as random access memory (RAM) or read only memory (ROM), a computer readable storage disk for a fixed disk drive (e.g., a hard disk drive), or a removable disk drive. In addition, the computer-readable storage medium 800 may be a flash memory device, a computer-readable tape, a CD-ROM, a DVD-ROM, a Blu-Ray, HD-DVD, UMD, or other optical storage medium.

The storage medium 800 contains—emotion recognition instructions 801 configured to facilitate—emotion recognition using multi-modal cues. The—emotion recognition instructions 801 may be configured to implement emotion estimation in accordance with the method described above, e.g., with respect to FIG. 1A, FIG. 1B, FIG. 1C or FIG. 1D. In particular, the—emotion recognition instructions 801 may optionally include optional data acquisition instructions 803 that are used to receive input signals from one or more sensors and convert them the a suitable form (e.g., digital form) for which emotion estimation may be performed. The input signals may be obtained in computer-readable form as pre-recorded data or from signals captured live at run time by sensors, such as a microphone array, image capture device, physiologic sensors, and the like. The emotion estimation instructions 801 may further include optional signal processing instructions 805 that may filter the converted signals from the various sensors to extract relevant features, as described above.

The emotion estimation instructions 801 may further include machine learning algorithm instructions 807 that implement one or more machine learning algorithms on the filtered converted signals, when executed. In particular, the machine learning algorithm instructions may direct a processor to perform a multi-modal method for determining an emotional state of a user that involves extracting one or more acoustic features, visual features, linguistic features, and physical features of the user (and optionally context features) from signals obtained by one or more sensors, analyzing the acoustic features, visual features, linguistic features, and physical features and optional context features with one or more machine learning algorithms, and extracting an emotional state of the user from analysis of the acoustic features, visual features, linguistic features, and physical features and optional context features with a machine learning algorithm. The machine learning algorithm instructions 807 may be configured to implement one or more of the aspects describe with respect to FIG. 1B, FIG. 1C, and FIG. 1D.

The emotion estimation instructions 801 may optionally include speech recognition instructions 809, which may modify an acoustic/language/dictionary model for speech recognition according to an estimated emotional state determined from multiple modes of input features.

Other Applications

Aspects of the present disclosure provide for greater accuracy in emotion recognition through the use of different types of cues. Accurate knowledge of a user's emotional state can be useful for many applications including call centers, virtual agents, and other natural user interfaces. Games can also use emotions as part of game input. For example some game applications can be as follows: whoever stays cool/calm under stress can get more points in the game. This can be used for educational games (i.e. training for tests, performing under stress, reading/spelling tests etc.). Similarly, call centers can use the caller's emotion to decide what to do next. Intelligent man-machine interface can benefit from emotion information; i.e. machine can dynamically adapt based on a user's emotional state; i.e. knowing whether the user is happy, frustrated etc.

There can be even more applications that can benefit from emotion recognition such as training tools/programs for professionals: training medical doctors, training soldiers, training customer support staff, etc. This method can be used for both character analysis and user profile generation. For example, multi-modal emotion recognition could be used as a tool to measure how well people do under pressure. For example, when students are taking exams, multi-modal emotional recognition could provide feedback during a practice test so that students can learn to recognize and manage their stress.

While the above is a complete description of the preferred embodiment of the present invention, it is possible to use various alternatives, modifications, and equivalents. Therefore, the scope of the present invention should be determined not with reference to the above description, but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. In the claims that follow, the word "or" is to be interpreted as a non-exclusive or, unless otherwise specified. The appended claims are not to be interpreted as including means-plus-function limitations, unless such a limitation is explicitly received in a given claim using the phrase "means for".

What is claimed is:

1. A method for determining an emotional state of a user, comprising:
    extracting features including one or more acoustic features, visual features, linguistic features, physical feature s from signals obtained by one or more sensors with a processor;
    analyzing the features including the acoustic features, visual features, linguistic features, and physical features with one or more machine learning algorithms implemented on a processor;
    wherein analyzing the acoustic features, visual features, linguistic features, and physical features includes use of separate machine learning algorithms for the acoustic, visual, linguistic, and physical features;
    wherein a first machine learning algorithm provides feedback to a second machine learning algorithm in a serial fashion; and
    extracting an emotional state of the user from analysis of the features including analysis of the acoustic features, visual features, linguistic features, and physical features with the one or more machine learning algorithms.

2. The method of claim 1, wherein analyzing the acoustic features, visual features, linguistic features, and physical features includes use of a machine learning algorithm that analyzes a combination of two or more different types of features from the group of the acoustic features, visual features, linguistic features, and physical features.

3. The method of claim 2, further comprising augmenting and reducing the dimension of the acoustic features, visual features, linguistic features, and physical features before using the machine learning algorithm to analyze the combination of two or more different types of features.

4. The method of claim 1, wherein analyzing the acoustic features, visual features, linguistic features, and physical features includes reducing a dimension of the acoustic, visual, linguistic, and physical features to produce corresponding reduced dimension acoustic, visual, linguistic, and physical features and using corresponding separate machine learning algorithms to analyze the reduced dimension acoustic, visual, linguistic, and physical features.

5. The method of claim 1, wherein analyzing the acoustic features, visual features, linguistic features, and physical features includes fusing estimated emotional states obtained in parallel from separate machine learning algorithms for the acoustic, visual, linguistic, and physical features.

6. The method of claim 1, further comprising changing a state of a computer system in response to the emotional state of the user extracted from analysis of the acoustic features, visual features, linguistic, and physical features.

7. The method of claim 6, further comprising performing automated speech recognition of one or more utterances of the user with the computer system.

8. The method of claim 6, wherein changing the state of the computer system includes using the emotional state of the user extracted from analysis of the acoustic features, visual features, linguistic features, and physical features to adjust one or more models used in the automated speech recognition.

9. The method of claim 1, wherein the acoustic features include features extracted from sound signals corresponding to the user's speech.

10. The method of claim 1, wherein the visual features include facial expressions, head poses, body gestures, and eye movements.

11. The method of claim 1, wherein the linguistic features include semantics, syntax, and lexical features from both user and non-user.

12. The method of claim 1, wherein the features further include one or more context features.

13. The method of claim 12, wherein the one or more context features include one or more features from game, movie, video, music, environmental characteristics, non-user characters, sound signals not corresponding to the user's speech, or visual signals not corresponding to the user.

14. The method of claim 1, wherein the physical features include heart rate, blood pressure, respiration rate, skin moisture, grip an object, depth and pace of breath, serotonin level, epinephrine level, skin moisture level, skin temperature, pressure in hands/fingers/wrist, level of saliva, level of hormones in enzymes in saliva, level of enzymes in saliva, or skin conductance.

15. An apparatus for determining an emotional state of a user, comprising:
a processor;
instructions executable by the processor, wherein the instructions are configured, when executed to extract one or more acoustic features, visual features, linguistic features, and physical features of the user from signals obtained by one or more sensors, analyze the acoustic features, visual features, linguistic features, and physical features with one or more machine learning algorithms;
wherein the instructions are configured to analyze the acoustic features, visual features, linguistic features, and physical features through use of separate machine learning algorithms for the acoustic visual, linguistic, and physical features;
wherein a first machine learning algorithm provides feedback to a second machine learning algorithm in a serial fashion; and
extract an emotional state of the user from analysis of the acoustic features, visual features, linguistic features, and physical features with the one or more machine learning algorithms.

16. The apparatus of claim 15, wherein the instructions are configured to analyze the acoustic features, visual features, linguistic features, and physical features by implementing a machine learning algorithm that analyzes a combination of two or more different types of features from the group of the acoustic features, visual features, linguistic features, and physical features.

17. The apparatus of claim 16, wherein the instructions are further configured to augment and reduce a dimension of the acoustic features, visual features, linguistic features, and physical features before using the machine learning algorithm to analyze the combination of two or more different types of features.

18. The apparatus of claim 15, wherein the instructions are configured to analyze the acoustic features, visual features, linguistic features, and physical features by reducing a dimension of the acoustic, visual, linguistic, and physical features to produce corresponding reduced dimension acoustic, visual, linguistic, and physical features and by using corresponding separate machine learning algorithms to analyze the reduced dimension acoustic, visual, linguistic, and physical features.

19. The apparatus of claim 15, wherein the instructions are further configured to change a state of a computer system in response to the emotional state of the user extracted from analysis of the acoustic features, visual features, linguistic features, and physical features.

20. The apparatus of claim 19, wherein the instructions are further configured to perform automated speech recognition of one or more utterances of the user with the computer system.

21. The apparatus of claim 19, wherein the instructions are further configured to change the state of the computer system by using the emotional state of the user extracted from analysis of the acoustic features, visual features, linguistic features, physical features to adjust a model used in the automated speech recognition.

22. The apparatus of claim 15, wherein the features further include one or more context features.

23. The apparatus of claim 22, wherein the one or more context features include one or more features from game, movie, video, music, environmental characteristics, non-user characters, sound signals not corresponding to the user's speech, or visual signals not corresponding to the user.

24. A non-transitory computer-readable medium having computer executable instructions embodied therein, wherein the instructions are configured to implement a method for determining an emotional state of a user, when executed, the method comprising:
extracting one or more acoustic features, visual features, linguistic features, and physical features from signals obtained by one or more sensors;
analyzing the acoustic features, visual features, linguistic features, and physical features with one or more machine learning algorithms;
wherein analyzing the acoustic features, visual features, linguistic features, and physical features includes use of separate machine learning algorithms for the acoustic, visual, linguistic, and physical features;

wherein a first machine learning algorithm provides feedback to a second machine learning algorithm in a serial fashion; and extracting an emotional state of the user from analysis of the acoustic features, visual features, linguistic features, and physical features with the one or more machine learning algorithms.

25. A method for determining an emotional state of a user, comprising:

extracting features including one or more acoustic features, visual features, linguistic features, physical feature s from signals obtained by one or more sensors with a processor;

analyzing the features including the acoustic features, visual features, linguistic features, and physical features with one or more machine learning algorithms implemented on a processor;

extracting an emotional state of the user from analysis of the features including analysis of the acoustic features, visual features, linguistic features, and physical features with the one or more machine learning algorithms; and changing a state of a computer system in response to the emotional state of the user extracted from analysis of the acoustic features, visual features, linguistic, and physical features, wherein changing the state of the computer system includes using the emotional state of the user extracted from analysis of the acoustic features, visual features, linguistic features, and physical features to adjust one or more models used in the automated speech recognition.

26. An apparatus for determining an emotional state of a user, comprising:

a processor;

instructions executable by the processor, wherein the instructions are configured, when executed to extract one or more acoustic features, visual features, linguistic features, and physical features of the user from signals obtained by one or more sensors, analyze the acoustic features, visual features, linguistic features, and physical features with one or more machine learning algorithms;

wherein the instructions are further configured to perform automated speech recognition of one or more utterances of the user with the computer system; wherein the instructions are further configured to change the state of the computer system by using the emotional state of the user extracted from analysis of the acoustic features, visual features, linguistic features, physical features to adjust a model used in the automated speech recognition.

27. A non-transitory computer-readable medium having computer executable instructions embodied therein, wherein the instructions are configured to implement a method for determining an emotional state of a user, when executed, the method comprising:

extracting one or more acoustic features, visual features, linguistic features, and physical features from signals obtained by one or more sensors;

analyzing the acoustic features, visual features, linguistic features, and physical features with one or more machine learning algorithms;

extracting an emotional state of the user from analysis of the acoustic features, visual features, linguistic features, and physical features with the one or more machine learning algorithms; and changing a state of a computer system in response to the emotional state of the user extracted from analysis of the acoustic features, visual features, linguistic, and physical features, wherein changing the state of the computer system includes using the emotional state of the user extracted from analysis of the acoustic features, visual features, linguistic features, and physical features to adjust one or more models used in the automated speech recognition.

* * * * *